United States Patent [19]

Morawski et al.

[11] Patent Number: 4,540,187

[45] Date of Patent: Sep. 10, 1985

[54] COLLET CHUCK FOR TAPERED WORKPIECES

[76] Inventors: Longine V. Morawski; Lawrence V. Morawski, both of P.O. Box 631, Roseville, Mich. 48066

[21] Appl. No.: 624,922

[22] Filed: Jun. 27, 1984

[51] Int. Cl.³ .............................................. B23B 5/22
[52] U.S. Cl. .................... 279/1 L; 279/2 R; 29/1.21
[58] Field of Search ........ 409/234; 279/1 DA, 1 DC, 279/1 L, 2 R, 46 R, 122; 29/1.21

[56] References Cited

U.S. PATENT DOCUMENTS

| | | | |
|---|---|---|---|
| 1,812,006 | 6/1931 | Jellicoe | 279/1 L |
| 2,067,618 | 1/1937 | Pachta | 279/2 |
| 2,851,274 | 9/1958 | Greer | 279/2 |
| 3,490,778 | 1/1970 | Parlker | 279/2 |
| 3,608,915 | 9/1971 | Hohwart | 279/1 L |
| 4,088,332 | 5/1978 | Chase | 279/2 R |
| 4,193,607 | 3/1980 | Pearson | 279/1 L |
| 4,416,459 | 11/1983 | Morawski et al. | 279/2 R |

Primary Examiner—Jimmy C. Peters
Attorney, Agent, or Firm—Barnes, Kisselle, Raisch, Choate, Whittemore & Hulbert

[57] ABSTRACT

The chuck disclosed has a work-gripping collet at the longitudinal axis thereof which is surrounded by front and rear annular slides that are spring biased in an axially forward direction. The slides are independently shiftable axially. The inner peripheral surface at the front end portion of the front slide and the inner peripheral surface at the rear end portion of the rear slide are inclined radially inwardly and axially rearwardly to correspond with the inclination of the outer surface of the externally tapered workpiece. The workpiece is telescoped rearwardly over the collet so that its external surface is first engaged by the inclined surface on the rear slide and then by the inclined surface on the front slide. After the leading end of the workpiece engages a part stop on the chuck the collet is shifted rearwardly to firmly grip the workpiece.

8 Claims, 4 Drawing Figures

COLLET CHUCK FOR TAPERED WORKPIECES

This invention relates to a collet chuck for tapered workpieces.

Tapered workpieces, for example, nose cones on projectiles, are sometimes difficult to retain in a chuck of a machine tool. The difficulty in chucking such workpieces frequently results not only from the configuration of the workpiece, but also because the taper thereon may vary slightly from one workpiece to another or the taper might not be a true conical taper.

The object of this invention is to provide a collet chuck admirably suited for gripping tapered workpieces.

A more specific object of this invention is to produce a collet chuck which assures concentricity between a tapered workpiece and the rotary axis of the chuck.

Other objects, features and advantages of the present invention will become apparent from the following description and accompanying drawings, in which.

Figure 1:
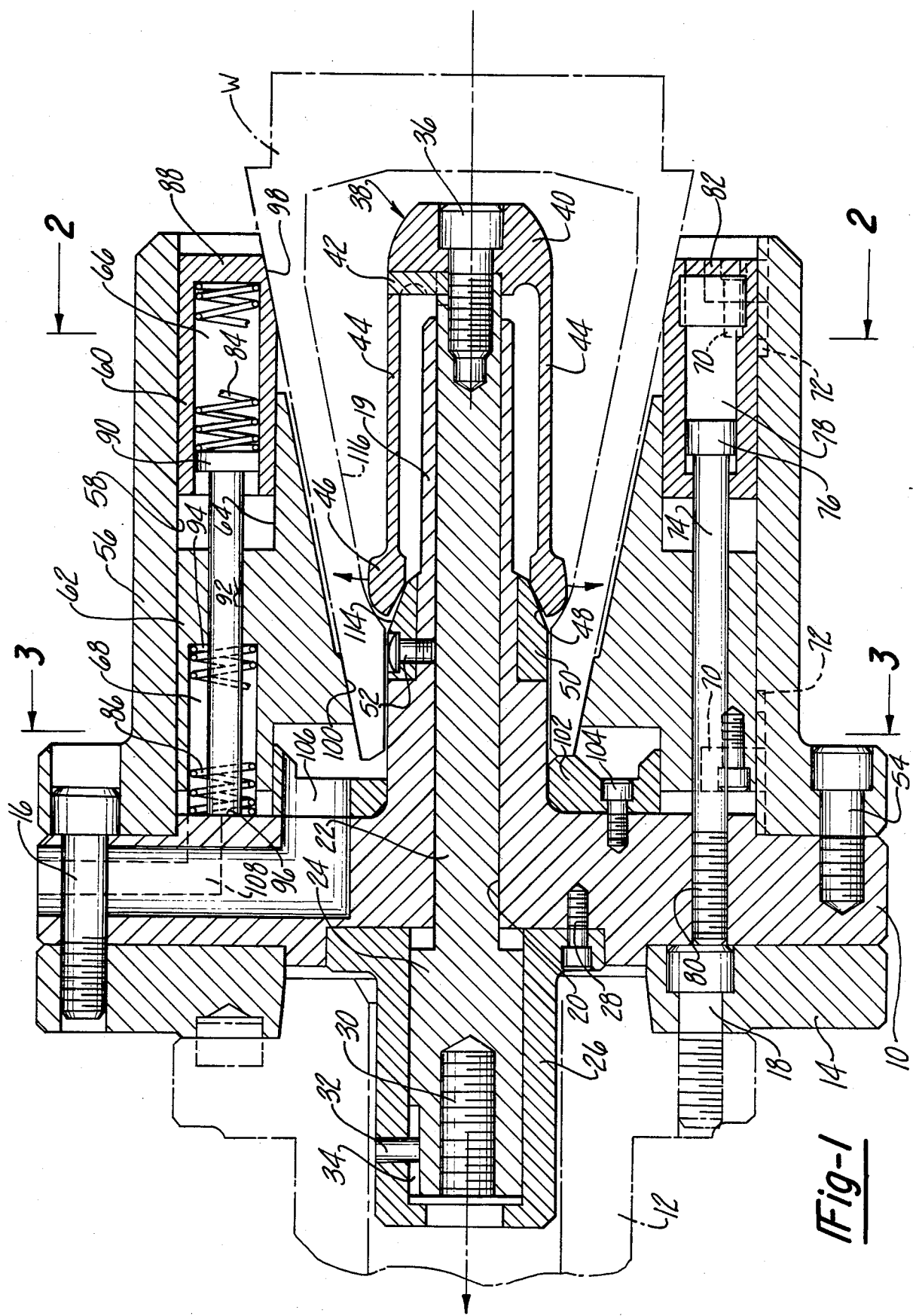
FIG. 1 is a vertical sectional view of a chuck according to the present invention showing the components thereof in the work-gripping position.
Figure 2:
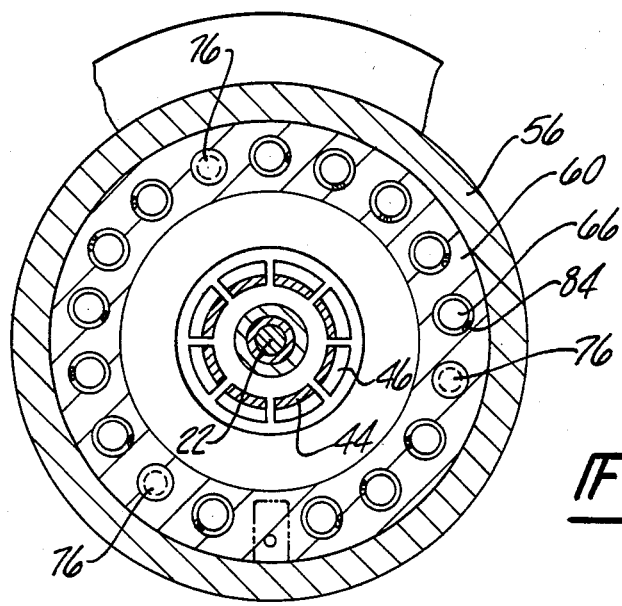
FIG. 2 is a sectional view along the line 2—2 in FIG. 1.
Figure 3:
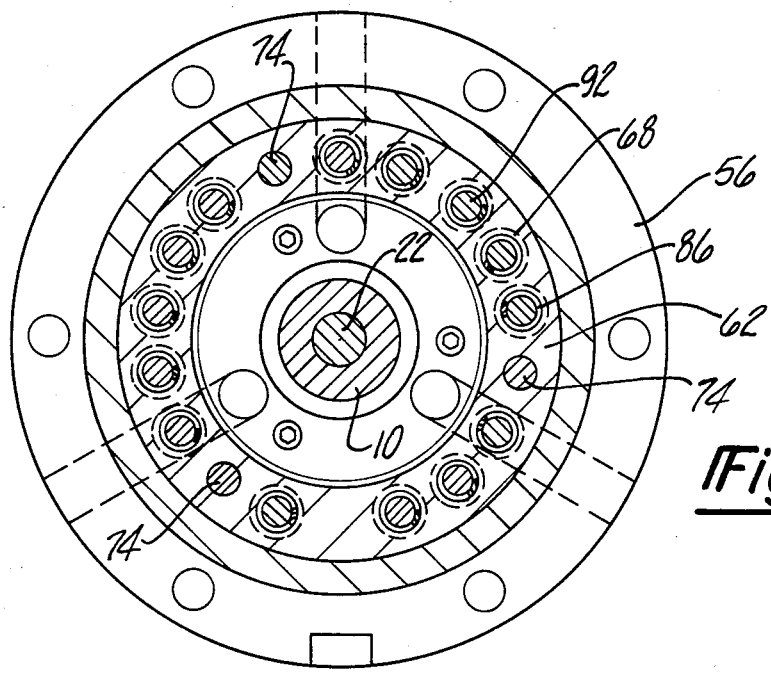
FIG. 3 is a sectional view along the line 3—3 in FIG. 1.

A chuck according to the present invention includes a body 10 adapted to be secured to the spindle 12 of a machine tool by means of an annular adaptor plate 14. Body 12 is connected to adaptor plate 14 by means of screws 16 and the adaptor plate 14 is mounted on the spindle of the machine tool by means of screws 18. Body 10 is formed with a central axially extending sleeve 19 having a bore 20 in which there is slideably arranged a puller shaft 22. The rear or inner end of shaft 22 is enlarged as at 24 and guided for axial sliding movement within a bushing 26. Bushing 26 is mounted on the rear face of body 10 by screws 28. The enlarged rear end 24 of shaft 22 is formed with a threaded socket 30 for connection with an axially shiftable drawbar (not shown) in the machine tool spindle. Shaft 22 is prevented from rotating by means of a key 32 in bushing 26 engaging a keyway 34 in the enlarged end 24 of shaft 22.

On the front end of shaft 22 there is secured, as by a screw 36, a collet sleeve 38. Collet sleeve 38 has a solid head 40 at the front end thereof which is non-rotatably fixed on the front end of shaft 22 by a pin 42. Collet sleeve 38 has a plurality of circumferentially spaced spring fingers 44 extending axially rearwardly from head 40. The rear ends of fingers 44 are enlarged as at 46 and have tapered faces 48. The tapered faces 48 are adapted to cooperate with an expander bushing 50 secured by a screw 52 on sleeve 19 so as to flex radially outwardly and inwardly in response to reciprocation of shaft 22.

On the front face of body 10 there is secured as by screws 54 a hollow cylinder 56. Within the bore 58 of cylinder 56 there is arranged a front slide 60 and a rear slide 62. The front end portion of rear slide 62 is formed with a reduced annular shoulder 64 on which the inner periphery of slide 60 is slideably guided. Slide 60 is in the form of a ring having a plurality of circumferentially spaced, axially extending pockets 66 therein. Likewise, rear slide 62 is formed as an annular member having a plurality of circumferentially spaced, axially extending pockets 68 therein. In the assembled condition of the chuck the pockets 66 in slide 60 are aligned axially with the pockets 68 in slide 62. Each slide 60,62 has a key 70 mounted thereon for engagement with a keyway 72 in the bore of cylinder 56 to prevent the slides from rotating relative to the body of the chuck. The extent of axial movement of slide 60 is determined by three screws 74 spaced circumferentially around the chuck. The heads 76 of screws 74 are disposed in axially extending pockets 78 in slide 60. The shanks of screws 74 extend through slide 62 and are threaded into the body 10 as at 80. The open forward ends of pockets 78 are closed by removable plugs 82.

Within the pockets 66,68 of slides 60,62 there are arranged compression springs 84,86, respectively. The forward ends of springs 84 bottom against the front end wall 88 of slide 60. The rear ends of springs 84 bear against the heads 90 of pins 92 which extend through the pockets 68 of slide 62. The forward ends of springs 86 in pocket 68 abut against the forward end faces 94 of pocket 68 and the rear ends of these springs abut against the front face 96 of body 10. Adjacent its front end slide 60 is formed with a narrow conically tapered surface 98 around its inner periphery. A similarly inclined narrow tapered surface 100 is formed around the inner periphery of slide 62 adjacent its rear or inner end. The degree of inclination of the surfaces 98,100 is determined primarily by the taper on the workpiece W to be chucked.

A part stop ring 102 is mounted on the body 10 of the chuck by means of screws 104. Ring 102 is adapted to be abutted by the front end of the workpiece W to locate the workpiece axially in the desired position on the chuck. The chuck body is also formed with suitable passageways 106 for the discharge of chips and with air bleed passageways 108.

Figure 4:
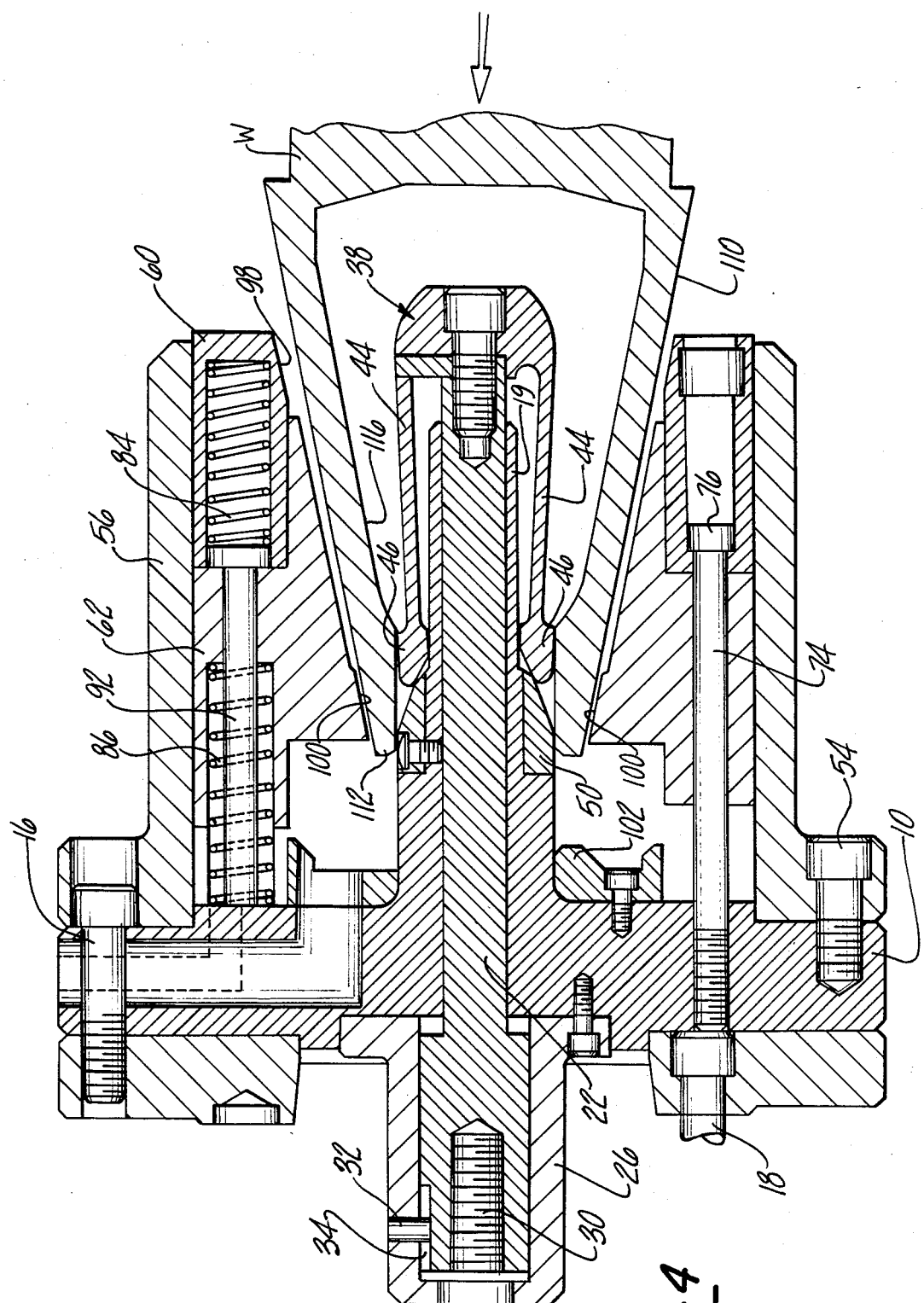
FIG. 4 is a view similar to FIG. 1 and showing the components of the chuck in their relative positions prior to engagement of the workpiece.

Prior to the insertion of a workpiece in the chuck the various components of the chuck assume the position illustrated in FIG. 4. Springs 84 acting between the heads of pins 92 and the front end wall of slide 60 bias the slide to its forwardmost position as limited by the heads of screws 74. Likewise, slide 62 is biased forwardly into engagement with the rear face of slide 62 by springs 86. With the chuck in this condition and the puller shaft 22 in its forwardmost position the workpiece W is telescoped over the forward end of collet sleeve 38 and is shifted axially rearwardly thereover. After the workpiece W is shifted axially rearwardly a slight extent from the position shown in FIG. 4 the outer conical surface 110 at the leading end of the workpiece engages the conical surface 100 on slide 62 and continued movement thereof axially rearwardly causes slide 62 to be shifted rearwardly on the chuck. Before the leading end 112 of the workpiece engages the stop ring 102 the rear end portion of the outer conical surface 110 of the workpiece engages the inner conical surface 98 of slide 60. It will be appreciated that even though the conical inclination of the surface 110 on the workpiece does not conform exactly to the inclination of the conical surfaces 98,100 on the two slides or even if the outer surface of the workpiece is slightly curved in an axial direction, the provision of the two slides 60,62 assures concentric alignment of the workpiece with the rotary axis of the chuck. Continued axial rearward displacement of the workpiece while it is engaged by both slides is permitted until the leading end 112 of the workpiece abuts against the part stop ring 102.

Thereafter the drawbar of the machine tool is actuated to retract shaft 22. Collet sleeve 38 is therefore shifted axially rearwardly which causes the enlarged ends 46 to engage the inclined annular surface 114 on expander bushing 50. Thus, the ends 46 of collet fingers 44 are displaced in a direction radially outwardly and axially rearwardly. These fingers engage the inner peripheral surface 116 of the workpiece and thereby clamp the workpiece firmly against ring 102 as shown in FIG. 1. In this position the workpiece is firmly gripped by the chuck in a position accurately concentric with the rotary axis of the chuck.

We claim:

1. A collet chuck for gripping an externally tapered workpiece comprising a body adapted to be mounted concentrically on the front end portion of the spindle of a machine tool, a collet sleeve axially shiftable on said body, said collet sleeve having a plurality of circumferentially spaced, radially resilient fingers thereon, means for shifting the collet axially, a collet expander mounted on the body and cooperating with the collet fingers to grip a workpiece when the collet sleeve is shifted axially in one direction, a front slide and a rear slide mounted on said body for independent axial movement thereon concentric with said collet sleeve, means biasing each slide in axially forward direction, the front slide having an inner peripheral surface adjacent the front end portion thereof which inclines radially inwardly and axially rearwardly, the rear slide having an inner peripheral surface adjacent the rear end portion thereof which inclines radially inwardly and axially rearwardly, said inclined surface of the front slide being of larger diameter than said inclined surface of the rear slide to enable an externally tapered workpiece to be inserted axially into said slides and thereby successively engage said inclined surfaces of the two slides to position the workpiece concentrically on the chuck and a stop mounted on said body in a position to be abutted by the workpiece after the workpiece has been shifted axially rearwardly on the chuck into engagement with said inclined surface of both slides.

2. A collet chuck as called for in claim 1 wherein the collet sleeve is positioned within the two slides and the fingers thereof are arranged to engage and grip the inner peripheral surface of the workpiece.

3. A collet chuck as called for in claim 2 wherein the collet sleeve is adapted to be shifted rearwardly into engagement with said expander to grip the workpiece.

4. A collet chuck as called for in claim 3 wherein said stop comprises a member having a front face adapted to be engaged by the leading edge of a workpiece inserted into said slides.

5. A collet chuck as called for in claim 1 wherein each slide comprises an annular member, said biasing means comprises independent spring means engaging each slide.

6. A collet chuck as called for in claim 5 including means on said body engaging said slides for limiting the extent of axial movement of the slides in a forward direction.

7. A collet chuck as called for in claim 6 wherein said slide limiting means are arranged and said inclined surfaces of the two slides are dimensioned so that the outer peripheral surface of the workpiece is first engaged by the rear slide and thereafter, upon continued axially rearward movement of the workpiece, by the front slide.

8. A collet chuck as called for in claim 6 wherein each slide is formed with a plurality of circumferentially spaced and axially extending pockets which are open at their rear ends, the pockets in the rear slide being axially aligned with the pockets in the front slide, a pin extending axially in each pair of aligned pockets, said pins having a head disposed within the pockets on the front slide and a reduced shank extending through the pockets on the rear slide, said spring means comprising compressible springs in the pockets on the front slide having their front ends abutting the front slide and their rear ends abutting the heads of said pins and compression springs in the pockets of the rear slide having their front ends abutting the rear slide and their rear ends abutting means fixed on said body.

* * * * *